US010510062B2

(12) United States Patent
Royyuru et al.

(10) Patent No.: US 10,510,062 B2
(45) Date of Patent: Dec. 17, 2019

(54) SYSTEMS AND METHODS FOR MOBILE DEVICE PURCHASE FLOWS

(71) Applicant: FIRST DATA CORPORATION, Greenwood Village, CO (US)

(72) Inventors: Vijay Kumar Royyuru, Norristown, PA (US); Brent Dewayne Adkisson, Omaha, NE (US); Raja Vel, Omaha, NE (US); Brent Allen Stains, Chambersburg, PA (US); Donncha O'Hegarty, Greenwood Village, CO (US)

(73) Assignee: FIRST DATA CORPORATION, Atlanta, GA (US)

( * ) Notice: Subject to any disclaimer, the term of this patent is extended or adjusted under 35 U.S.C. 154(b) by 786 days.

(21) Appl. No.: 14/200,645

(22) Filed: Mar. 7, 2014

(65) Prior Publication Data
US 2015/0254630 A1 Sep. 10, 2015

(51) Int. Cl.
*G06Q 40/00* (2012.01)
*G06Q 20/32* (2012.01)
*G06Q 20/40* (2012.01)
*H04W 4/50* (2018.01)
*H04W 4/80* (2018.01)

(52) U.S. Cl.
CPC ......... *G06Q 20/322* (2013.01); *G06Q 20/327* (2013.01); *G06Q 20/401* (2013.01); *H04W 4/50* (2018.02); *H04W 4/80* (2018.02)

(58) Field of Classification Search
USPC .......................................................... 705/39
See application file for complete search history.

(56) References Cited

U.S. PATENT DOCUMENTS

2010/0114733 A1* 5/2010 Collas .................... G06Q 20/12
705/26.1
2013/0013499 A1* 1/2013 Kalgi ..................... G06Q 20/12
705/41
(Continued)

OTHER PUBLICATIONS

Samsung takes a page from Apple's Passbook with new Wallet app . . . https://www.theverge.com/2013/2/27/.../samsung-wallet-app-apple-passbook-features Feb. 27, 2013 (Year: 2013).*
(Continued)

*Primary Examiner* — Hani M Kazimi
*Assistant Examiner* — Hatem M Ali
(74) *Attorney, Agent, or Firm* — Eversheds Sutherland (US) LLP

(57) ABSTRACT

This disclosure describes systems, methods, and computer-readable media related to mobile device purchase flows. In some embodiments, a mobile device may obtain a uniform resource identifier (URI). The mobile device may launch a browser based at least in part on the URI. The mobile device may submit a first set of data to a server based at least in part on the URI and receive a re-direct URI. The mobile device may launch an application in response to receiving the re-direct URI from the server, wherein the application submits a second set of data to the server. The mobile device may facilitate completion of a transaction by the application based at least in part on matching the first set of data and the second set of data at the server.

21 Claims, 6 Drawing Sheets

(56) References Cited

U.S. PATENT DOCUMENTS

| | | | |
|---|---|---|---|
| 2014/0122563 A1* | 5/2014 | Singh | H04L 67/34 709/203 |
| 2014/0164254 A1* | 6/2014 | Dimmick | G06Q 20/4012 705/71 |
| 2015/0106186 A1* | 4/2015 | Hopkinson | 705/14.27 |
| 2016/0050203 A1* | 2/2016 | Hefetz | H04L 63/18 726/7 |

OTHER PUBLICATIONS

Purchasing FAQ | URI Purchasing—University of Rhode Island https://web.uri.edu/purchasing/faq/, Nov. 1, 2017.*
PeopleSoft Purchasing Limited Value (LV . . . -University of Rhode Island https://web.uri.edu/purchasing/.../PeopleSoft-Purchasing-LV-Requisition-Rev-2-14-2018.*

* cited by examiner

SYSTEMS AND METHODS FOR MOBILE DEVICE PURCHASE FLOWS

BACKGROUND

Mobile devices, such as smart phones and tablets, have become more prevalent and sophisticated in their use. Many users opt to use mobile devices to initiate and complete financial transactions in lieu of credit cards. However, often times, using a mobile device instead of a credit card may be cumbersome, as different applications on the mobile device often do not communicate with each other in order to facilitate the completion of a transaction. In many instances, it may take users multiple explicit actions to scan a tag, such as a quick response (QR) tag or near field communication (NFC) tag, and load the information into an application.

BRIEF DESCRIPTION OF THE DISCLOSURE

This disclosure relates to systems and methods for mobile device purchase flows. In one embodiment, a computer-readable medium storing computer-executable instructions may be provided. The computer-executable instructions, when executed by a processor, may cause the processor to perform operations comprising obtaining a uniform resource identifier (URI); launching a browser based at least in part on the URI; submitting a first set of data to a server based at least in part on the URI and receiving a re-direct URI; launching an application in response to receiving the re-direct URI from the server, wherein the application submits a second set of data to the server; and facilitating completion of a transaction by the application based at least in part on matching the first set of data and the second set of data at the server.

In one aspect of an embodiment, the operations may further comprise obtaining, from one or more sensors associated with a mobile device, the URI from a quick response (QR) code or a near field communication tag.

In one aspect of an embodiment, the operations may further comprise obtaining the URI from a hyperlink selected by a user of a mobile device.

In one aspect of an embodiment, the operations may further comprise in response to a server determining the application is not stored on a mobile device, receiving instructions from the server redirecting the browser to an application store to obtain the application; and installing the application on the mobile device.

In one aspect of an embodiment, the operations may further comprise determining that the application is not registered with the server; receiving registration information from a user of a mobile device; transmitting the registration information to the server; and receiving, from the server, confirmation that the application is registered with the server.

In one aspect of an embodiment, the URI may comprise a plurality of parameters, the parameters comprising: an application label, a version indicator, a tag identifier, a tag signature, or a merchant name.

In one aspect of an embodiment, the data associated with the URI is saved on the server based on an action by the browser and retrieved based on an action by the application.

In another embodiment, a method may be provided. The method may include obtaining, by one or more processors of a mobile device, a uniform resource identifier (URI); launching, by the one or more processors, a browser based at least in part on the URI; submitting, by the one or more processors, a first set of data to a server based at least in part on the URI and receiving a re-direct URI; launching, by the one or more processors, an application in response to receiving the re-direct URI from the server, wherein the application submits a second set of data to the server; and facilitating, by the one or more processors, completion of a transaction by the application based at least in part on matching the first set of data and the second set of data at the server.

In one aspect of an embodiment, the method may include obtaining, by the one or more processors from one or more sensors associated with the mobile device, the URI from a quick response (QR) code or a near field communication tag.

In one aspect of an embodiment, the method may include obtaining, by the one or more processors, the URI from a hyperlink selected by a user of the mobile device.

In one aspect of an embodiment, the method may include in response to a server determining the application is not stored on the mobile device, receiving instructions from the server redirecting the browser to an application store to obtain the application; and installing, by the one or more processors, the application on the mobile device.

In one aspect of an embodiment, the method may include determining, by the one or more processors, that the application is not registered with the server; receiving, by the one or more processors, registration information from a user of the mobile device; transmitting, by the one or more processors, the registration information to the server; and receiving, by the one or more processors from the server, confirmation that the application is registered with the server.

In one aspect of an embodiment, the URI may comprise a plurality of parameters, the parameters comprising: an application label, a version indicator, a tag identifier, a tag signature, or a merchant name.

In one aspect of an embodiment, the data associated with the URI is saved on the server based on an action by the browser and retrieved based on an action by the application.

In another embodiment, a system may include at least one memory storing computer-executable instructions; and at least one processor, wherein the at least one processor is configured to access the at least one memory and to execute the computer-executable instructions to obtain a uniform resource identifier (URI); launch a browser based at least in part on the URI; submit a first data set to a server based at least in part on the URI and receive a re-direct URI; launch an application in response to receiving the re-direct URI from the server, wherein the application submits a second data set to the server; and facilitate completion of a transaction by the application based at least in part on matching the first data set and the second data set.

In one aspect of an embodiment, the at least one processor may be further configured to execute the computer-executable instructions to obtain, from one or more sensors associated with a mobile device, the URI from a quick response (QR) code or a near field communication tag.

In one aspect of an embodiment, the at least one processor may be further configured to execute the computer-executable instructions to obtain the URI from a hyperlink selected by a user of a mobile device.

In one aspect of an embodiment, the at least one processor may be further configured to execute the computer-executable instructions to, in response to a server determining the application is not stored on a mobile device, receive instructions from the server redirecting the browser to an application store to obtain the application; and install the application on the mobile device.

In one aspect of an embodiment, the at least one processor may be further configured to execute the computer-executable instructions to determine that the application is not registered with the server; receive registration information from a user of a mobile device; transmit the registration information to the server; and receive, from the server, confirmation that the application is registered with the server.

In one aspect of an embodiment, the URI may comprise a plurality of parameters, the parameters comprising: an application label, a version indicator, a tag identifier, a tag signature, or a merchant name.

In one aspect of an embodiment, the data associated with the URI is saved on the server based on an action by the browser and retrieved based on an action by the application.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
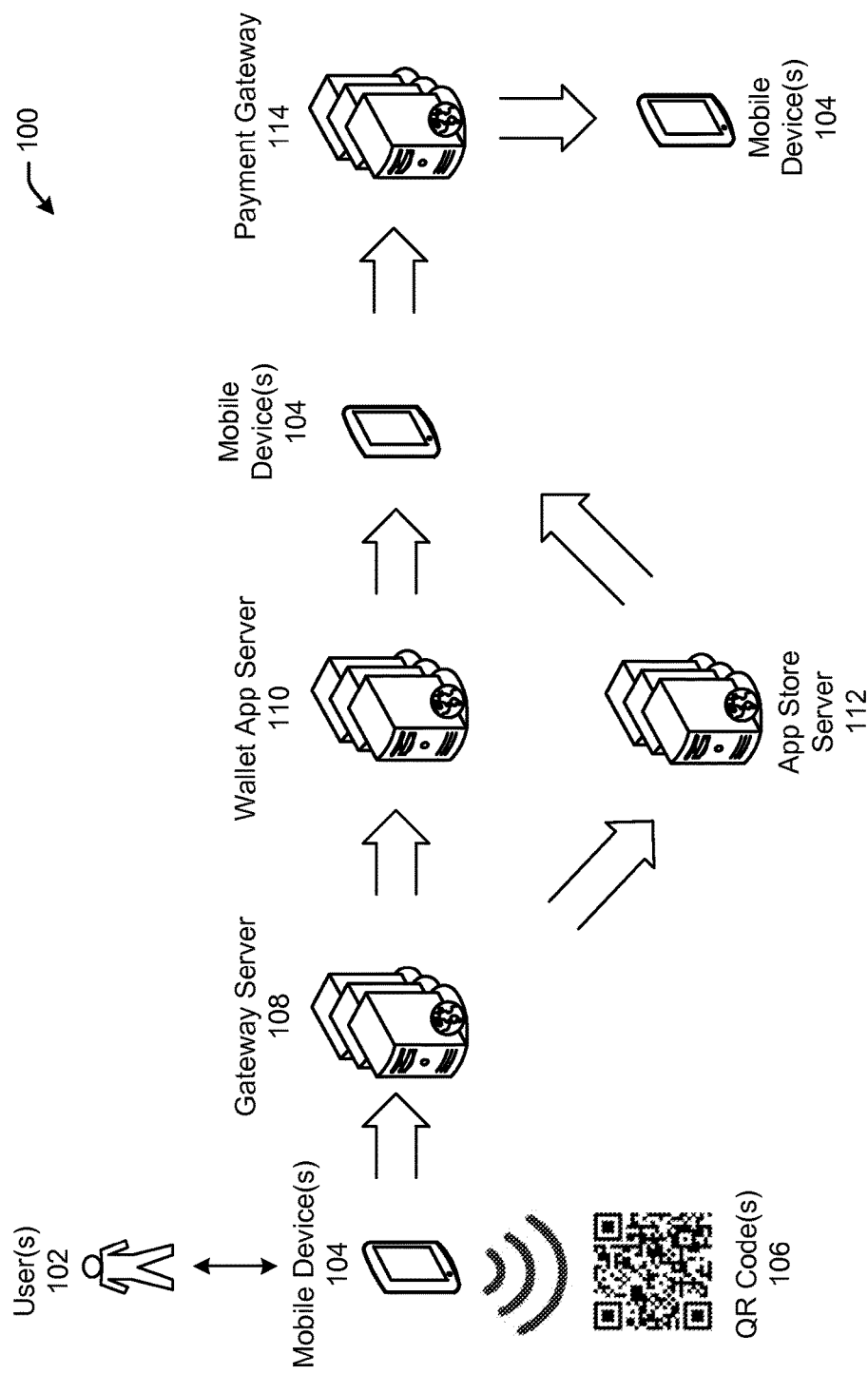
FIG. 1 depicts an illustrative data flow between various components of an illustrative system architecture for mobile device purchase flows in accordance with one or more embodiments of the disclosure.

This disclosure relates to, among other things, systems, methods, computer-readable media, techniques and methodologies for mobile device purchase flows. In some embodiments, users may wish to use their mobile device, such as a smart phone or tablet, as a tool for initiating and completing financial transactions. A user may use a camera on a mobile device to scan a quick response (QR) code for an advertisement of an item they encounter, such as on a poster in a transit station. The QR code may include a universal resource identifier (URI), such as a universal resource locator (URL). The URI or URL may include multiple parameters, such as an application label, version, QR tag identifier, QR tag signature, and a merchant name. The mobile device may scan the QR tag which may initiate a browser being launched and directed to a website. The website may detect and store the different information received from the mobile device, such as the browser user agent, source IP address, and obtain the different parameters that were included in the QR tag. The website may determine, based on the information received from the mobile device, the type of mobile device and redirect the user to the appropriate application or app store. The application or app store may determine whether a wallet application is installed on the mobile device. If the application or app store determines the wallet application is not installed on the mobile device, the application or app store may prompt the user to install the wallet application or app. If the app store determines the wallet application is installed on the mobile device, the application or app store may launch the wallet application or app.

The wallet application or app may then establish communication with a gateway server and submit the same mobile device identifying information that was stored via the website originally, such as the browser user agent, IP address, or any other device identifiers. Upon receiving the second submission from the wallet application, the gateway server may then establish a connection with other servers to facilitate matching the two sets of mobile device identifier submissions (e.g., from the information stored by the website and received from the mobile device) and retrieval of information about the product or service associated with the QR tag that was initially scanned and facilitate completion of the transaction. In some embodiments, a transaction may be initiated and completed with a single scan of a QR tag and minimal interaction from the user, resulting in a less cumbersome experience for the user.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

FIG. 1 depicts an illustrative data flow between various components of an illustrative system architecture for mobile device purchase flows in accordance with one or more embodiments of the disclosure. For illustrative purposes, this disclosure generally describes the methods and systems in the context of merchandise, such as consumer goods (e.g., electronic books, movies, music, physical products, etc.). However, the product as described herein may be generally applicable to physical goods and/or services.

One or more illustrative mobile devices 104 operable by one or more users 102 are illustratively depicted in FIG. 1. The mobile device(s) 104 may include any suitable device capable of obtaining universal resource identifiers (URIs), such as via QR codes 106, NFC tags, URLs, or the like, receiving and rendering webpages and communication with an e-commerce system, such as an online retailer. The mobile device(s) 104 may include any suitable processor-driven computing device including, but not limited to, a smartphone or other cellular device, a tablet device, an electronic reader device, a laptop computing device, a gaming console, a multimedia content streaming device, a set-top box, wearable computing devices, and so forth. For ease of explanation, the mobile device(s) 104 and the user(s) 102 may be described herein in the singular; however, it should be appreciated that multiple mobile devices 104 operable by multiple users 102 may be provided.

In various example embodiments, a user 102 may interact with a mobile device 104 to scan a QR code 106. For example, the user may use a QR code scanning application to capture a QR code 106 displayed on a poster for a product, such as a book. The mobile device 104 may then obtain a URI from the QR code 106. Based on the URI, the mobile device 104 may launch a web browser. The web browser may transmit data to a gateway server 108. The gateway server 108 may receive the information from the mobile device 104. The information received from the mobile device 104 may be parsed to identify a plurality of parameters, such as the type of mobile device 104, version of the mobile device 104, a QR tag identifier, a QR tag signature, and/or a merchant name, as well as mobile device identifiers, such as source IP address or the like. The parameters and identifiers may then be transmitted to a wallet app server 110 for further processing and storage. The gateway server 108 may also determine the type and version of the mobile device 104 based on one or more of the identified parameters from the received data. The gateway server 108 may then redirect the browser of the mobile device 104 to an app store server 112. The app store server 112 may determine whether a wallet application or app is installed on the mobile device 104. If the wallet application or app is not installed on the mobile device 104, the app store server 112 may initiate installation of the wallet application or app on the mobile device 104. If the wallet application or app is installed on the mobile device 104, then the app store server 112 may initiate launching of the wallet application or app on the mobile device 104.

Once the wallet application or app is executing on the mobile device 104, the wallet application may submit its mobile device identifier data to the wallet app server 110 in order to match and retrieve stored information, such as the parameters from the initial scan of the QR code 106 from the wallet app server 110. The wallet application or app executing on the mobile device 104 may then communicate with a payment gateway 114 to initiate a financial transaction, such as a purchase transaction for the book associated with the scanned QR code 106. The payment gateway 114 may receive information from the mobile device 104 and facilitate completion of the financial transaction. The payment gateway 114 may then communicate with the mobile device 104 to confirm either completion of the transaction or notify the mobile device 104 of any issues with the transactions.

Figure 2:
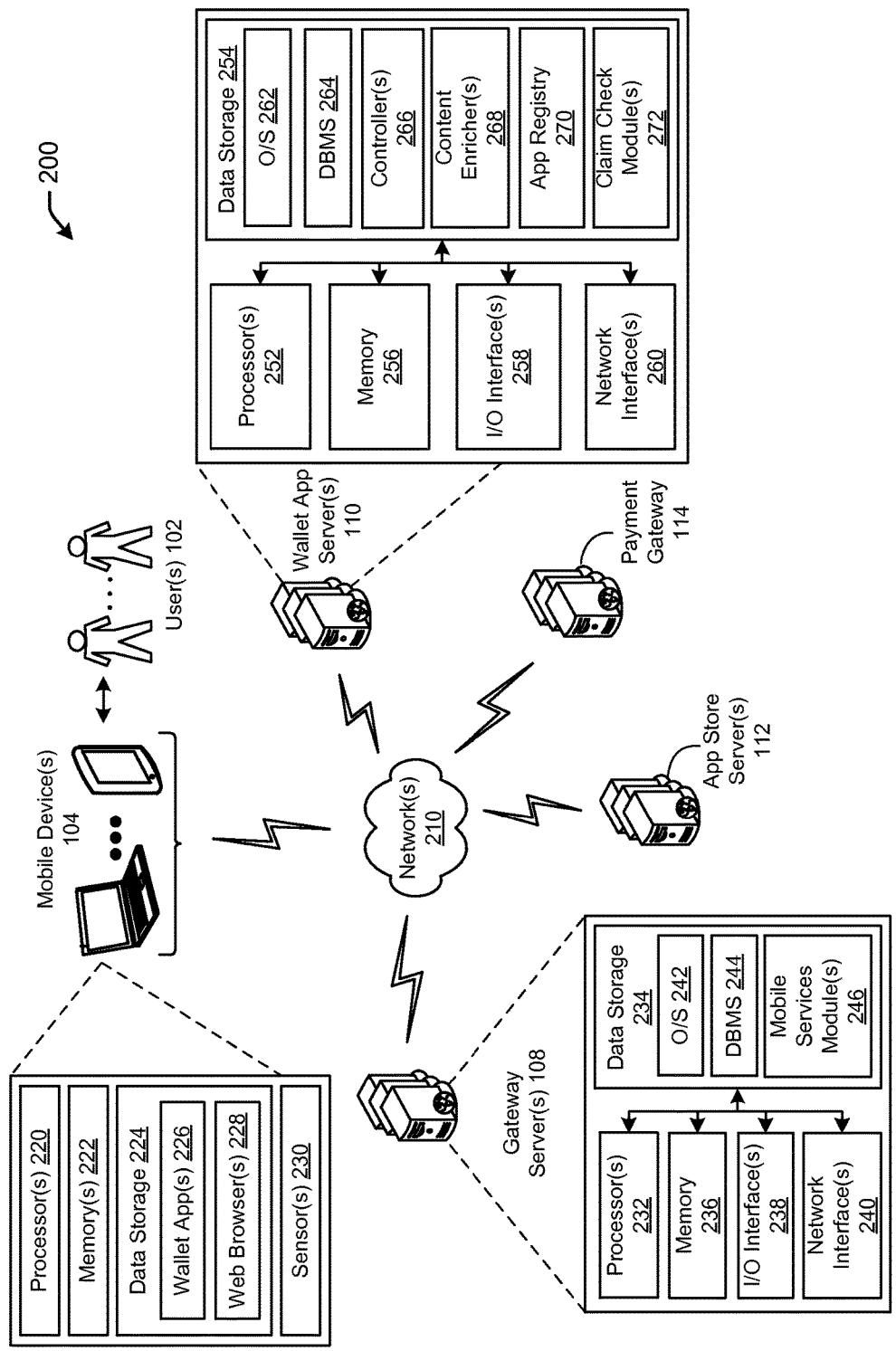
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include one or more mobile devices 104 operable by one or more users 102, one or more gateway server(s) 108, one or more wallet app server(s) 110, one or more app store server(s) 112, and/or one or more payment gateway server(s) 114. The illustrative architecture 200 may also include one or more business services server(s) (not pictured), one or more datastore(s) (not pictured), and/or one or more enrollment vault server(s) (not pictured). The mobile device(s) 104 may include any of the types of devices described through reference to FIG. 1.

Any of the mobile device(s) 104, one or more gateway server(s) 108, one or more wallet app server(s) 110, one or more app store server(s) 112, and/or one or more payment gateway server(s) 114 may be configured to communicate with each other and any other component of the architecture 200 via one or more network(s) 210. The network(s) 210 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 210 may have any suitable communication range associated therewith and may include, for example, global networks (e.g., the Internet), metropolitan area networks (MANs), wide area networks (WANs), local area networks (LANs), or personal area networks (PANs). In addition, the network(s) 210 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The mobile devices 104 may include one or more processor(s) 220 that may include any suitable processing unit capable of accepting digital data as input, processing the input data based on stored computer-executable instructions, and generating output data. The computer-executable instructions may be stored, for example, in the data storage 224 and may include, among other things, operating system software and application software. The computer-executable instructions may be retrieved from the data storage 224 and loaded into the memory 222 as needed for execution. The processor(s) 220 may be configured to execute the computer-executable instructions to cause various operations to be performed. The processor(s) 220 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 224 may store program instructions that are loadable and executable by the processor(s) 220, as well as data manipulated and generated by the processor(s) 220 during execution of the program instructions. The program instructions may be loaded into the memory 222 as needed for execution. Depending on the configuration and implementation of the mobile device(s) 104, the memory 222 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 222 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

Various program modules, applications, or the like may be stored in data storage 224 that may comprise computer-executable instructions that when executed by the processor(s) 220 cause various operations to be performed. The memory 222 may have loaded from the data storage 224 one or more operating systems (O/S) that may provide an interface between other application software (e.g., dedicated applications, a browser application, a web-based application, a distributed client-server application, etc.) executing on the mobile device 104 and the hardware resources of the mobile device(s) 104. More specifically, the O/S may include a set of computer-executable instructions for managing the hardware resources of the mobile device(s) 104 and for providing common services to other application programs (e.g., managing memory allocation among various application programs). The O/S may include any operating system now known or which may be developed in the future including, but not limited to, any mobile operating system, desktop or laptop operating system, mainframe operating system, or any other proprietary or open-source operating system.

The data storage 224 may additionally include various other program modules that may include computer-executable instructions for supporting a variety of associated functionality. For example, the data storage 224 may include one or more application(s) 226 or apps and/or one or more web browser(s) 228. In some embodiments, the one or more wallet application(s) 226 or app may include computer-executable instructions that in response to execution by the processor(s) 220 cause operations to be performed including obtaining a URI, such as from a one or more sensor(s) 230 (e.g., scanning a QR code 106) and initiating a financial transaction to purchase a good and/or service associated with the URI. In some embodiments, the one or more web browser(s) 228 may include computer-executable instructions that in response to execution by the processor(s) 220 cause operations to be performed including accessing websites, sending and receiving requests for data, and the like.

The mobile device(s) 104 may include one or more sensor device(s) 230, such as image sensors and/or collection devices (e.g., a microphone, cameras, video cameras, near field communication (NFC) scanners, RF scanners, infrared scanners, quick response (QR) code scanners, etc.) to capture one or more universal resource identifier(s) (URIs).

The gateway server(s) 108 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the gateway server(s) 108, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The gateway server(s) 108 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The gateway server(s) 108 may further include network interface(s) 240 that facilitate communication between the gateway server(s) 108 and other devices of the illustrative system architecture 200 (e.g., mobile device(s) 104, wallet app server(s) 110, etc.) or application software via the network(s) 210. The gateway server(s) 108 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, gesture detection or input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the gateway server(s) 108 and the hardware resources of the gateway server(s) 108. More specifically, the O/S 242 may include a set of computer-executable instructions for managing the hardware resources of the gateway server(s) 108 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores. The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more mobile services module(s) 246. The mobile services module(s) 246 may include computer-executable instructions that in response to execution by the processor(s) 232 cause operations to be performed including receiving and storing data and parameters received from a mobile device 104, determining the type and version of mobile device 104 based at least in part on information received from the mobile device, redirecting the mobile device 104 to an appropriate app store server 112, and/or initiating registration of the user 102 and/or wallet application 226 or app.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The wallet app server(s) 110 may include one or more processor(s) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the wallet app server(s) 110, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The wallet app server(s) 110 may further include additional data storage such as removable storage and/or non-removable storage including, but not limited to, magnetic storage, optical disk storage, and/or tape storage. In any instance, data storage 254 may provide non-volatile storage of computer-executable instructions and other data. The memory 256 and/or the data storage 254, removable and/or non-removable, are examples of computer-readable storage media (CRSM).

The wallet app server(s) 110 may further include network interface(s) 260 that facilitate communication between the wallet app server(s) 110 and other devices of the illustrative system architecture 200 (e.g., mobile device(s) 104, gateway server(s) 108, etc.) or application software via the network(s) 210. The wallet app server(s) 110 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, gesture detection or input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the wallet app server(s) 110 and the hardware resources of the wallet app server(s) 110. More specifically, the O/S 262 may include a set of computer-executable instructions for managing the hardware resources of the wallet app server(s) 110 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more controller(s) 266, one or more content enricher(s) 268, an app registry 270, and/or one or more claim check module(s) 272.

The controller(s) 266 may include computer-executable instructions that in response to execution by the processor(s) 252 cause operations to be performed including controlling the flow of application lookups, receiving and storing data received from the mobile device 104, claim check generation, and/or redirection instructions. Additionally, the controller(s) 266 may responsible for management of claim checks and facilitating linking the wallet application registration with the original request received from the mobile device 104 via the QR code, NFC tag, URL, or the like.

The content enricher(s) 268 may include computer-executable instructions that in response to execution by the processor(s) 252 cause operations to be performed including enriching a message prior to storing the parameters received from the mobile device 104, including mobile IP, geolocation information, user agent information, etc. The app registry 270 may include computer-executable instructions that in response to execution by the processor(s) 252 cause operations to be performed including storing and maintaining information associated with the wallet application 226 or app and where the wallet application or app is located in one or more app store server(s) 112. The claim check module(s)

272 may include computer-executable instructions that in response to execution by the processor(s) 252 cause operations to be performed including generating a unique key that is returned to the wallet application 226 or app installed on the mobile device 104. Upon return of the key at the time of wallet registration, the data from the original request may be returned to the mobile device 104.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

In some embodiments, the architecture 200 may include one or more app store server(s) 112 which may be configured to determine if an application, such as the wallet application 226 or app, is installed on a mobile device 104. If the application or app is not installed on the wallet application 226, the app store server 112 may initiate installation of the application or app. If the application or app is installed on the app store server 112, then the app store server 112 may launch the application or app on the mobile device 104.

In some embodiments, the architecture 200 may include one or more payment gateways 114. The payment gateways 114 may receive information from the wallet application 226 or app of a mobile device 104 and facilitate completion of a financial transaction initiated by the wallet application 226 or app.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
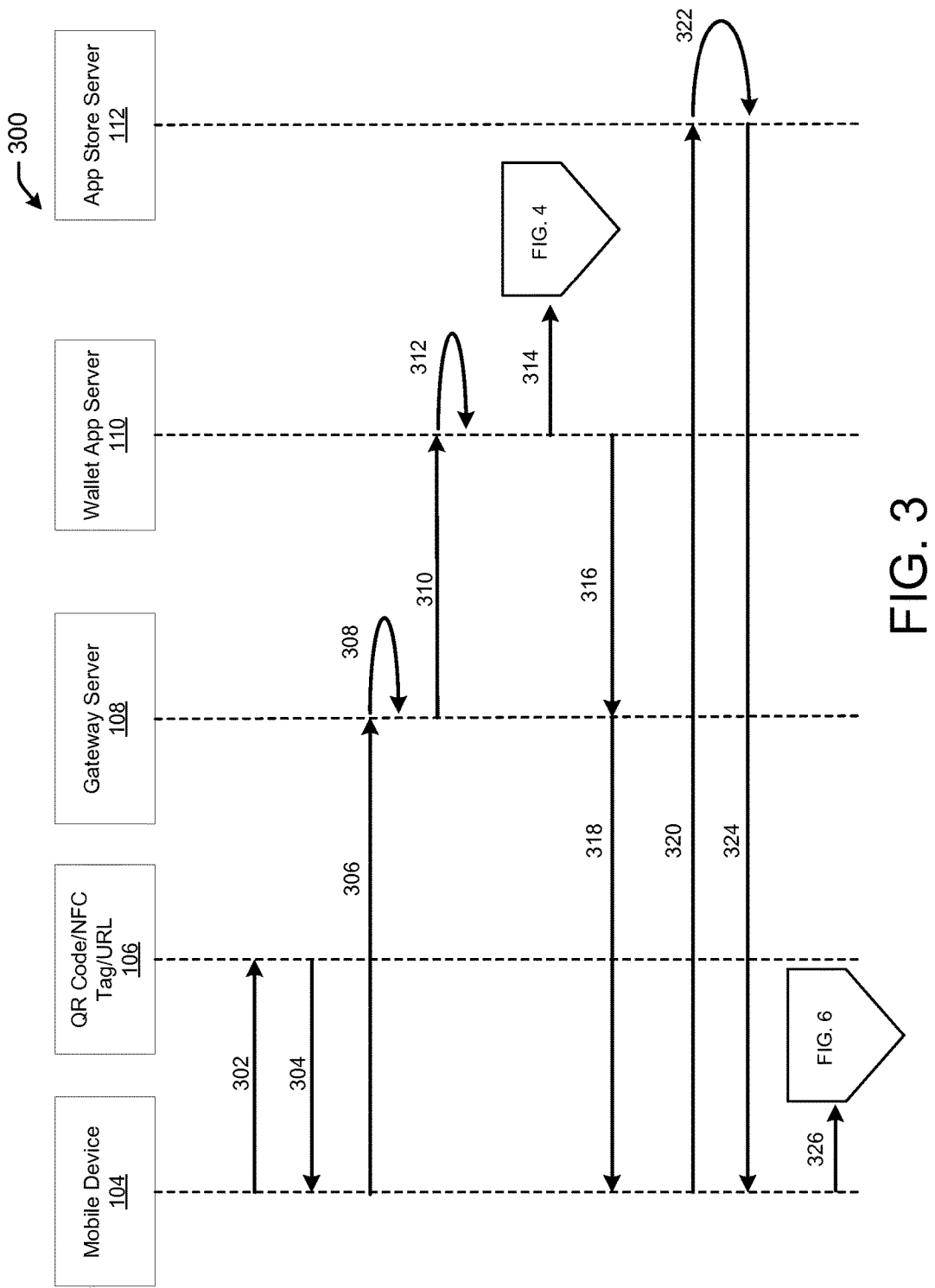
FIG. 3 is a process flow diagram of an illustrative method for application discovery for mobile device purchase flows in accordance with one or more embodiments of the disclosure.

FIG. 3 is a process flow diagram of an illustrative method 300 for application discovery for mobile device purchase flows in accordance with one or more embodiments of the disclosure. In some embodiments, at exchange 302, a user 102 may interact with a mobile device 104 to obtain a universal resource identifier (URI). The URI may be in the form of a QR code 106, an NFC tag, and/or a URL. The URI may be displayed and associated with a product. In some embodiments, at exchange 304, the URI may be obtained by the user 102 selecting a URL on a mobile device. In some embodiments, at exchange 304, the URI may be obtained by the user 102 using one or more sensor devices 230 associated with the mobile device 104 to scan or otherwise capture the URI. For example, the user 102 may use a camera in conjunction with a QR code scanning application to scan a QR code 106 displayed, such as on a poster. The QR code scanning application may obtain a URI from the QR code 106.

In some embodiments, the obtained URI may include multiple parameters, including, but not limited to, an app label, a version indicator, a tag identifier, a tag signature, and/or a merchant name. In some embodiments, the URI may also include a keyword. The app label may indicate an application or service associated with the URI. The version indicator may include the version of the application or service associated with the URI. The tag identifier may be an identifier associated with different kinds of information. For example, the tag identifier may be associated with information provided by a merchant, such as an action. The action may indicate an action to be initiated upon selection of the URI, such as a check-in, checkout, discovery of products and/or services, or the like. In some embodiments, the action may require additional information to be provided. For example, if the action is a checkout action, then an amount to be paid must be provided by the merchant. Additional information may be retrieved based at least in part on the tag identifier. For example, once an action has been identified (e.g., checkout action), the user 102 may be prompted to verify payment information, such as locally stored payment information or payment information associated with the user 102 retrieved from a remote server. The tag identifier may retrieve additional information, such as information associated with a merchant, a payment gateway 114 associated with the merchant, or the like.

The tag signature may be a parameter used to validate and/or authenticate a particular URI. In some embodiments, the tag signature must be presented with the tag identifier to authenticate that the URI was not tampered with or otherwise manipulated. The merchant name parameter indicates the name of the merchant. In some embodiments, the merchant name parameter may be optional.

An example URI that may be obtained from, for example, a QR code 106, is:

http://sampledomain.com/FooBar/?AppLabel=FDQRTag&Version=0100&TagID=123456&Signature=ABCD9876&Name=AAABBBB In the above example, the URI directs to sampledomain.com and the parameters included in the URI are as follows: keyword is FooBar, the app label is FDQRTag, the version indicator is 0100, the tag identifier is 123456, the tag signature is ABCD9876, and the merchant name is AAABBBB.

At exchange 306, a web browser 228 of the mobile device 104 may be launched in response to obtaining the URI and directed to a gateway server 108. The gateway server 108 may receive data from the mobile device 104, such as the parameters included in the URI. The gateway server 108 may also receive additional information from the mobile device 104, such as a browser user agent, source IP address, and the like to uniquely identify that mobile device. The additional information may be used to identify the type of mobile device 104 and/or web browser 228 utilized to communicate with the gateway server 108.

At exchange 308, the gateway server 108 may perform one or more security services. For example, the gateway server 108 may determine whether the URI was not tampered with or otherwise manipulated based at least in part on the tag signature received from the mobile device 104. The gateway server 108 may determine the type and version of the mobile device 104 based at least in part on the data received from the mobile device 104. The gateway server 108 may identify the one or more parameters and identifiers received from the mobile device 108, and at exchange 310, may transmit the parameters and identifiers to the wallet app server 110 for further processing and storage.

At exchange 310, the wallet app server 110 may receive data from the gateway server 108 and identify an app store server 112 associated with the mobile device 104 based at least in part on data received from the mobile device 104. For example, the wallet app server 110 may analyze the data received from the gateway server 108 which was received from the mobile device 104, and determine that the mobile device 104 is an iPhone™ and may determine that the app store server 112 associated with the mobile device 104 is an Apple™ app store server. At exchange 312, the wallet app server 110 may perform one or more security services on the data received from the gateway server 108. At exchange 314, the wallet app server may initiate the process for claim check creation, as described below in relation to FIG. 4.

At exchange 316, the wallet app server 110 may transmit a message and/or notification to the gateway server 108 indicating the app store server 112 associated with the mobile device 104 and may provide an app store link. In some embodiments, based at least in part on the information received from the mobile device 104, the wallet app server 110 may identify an appropriate application (e.g., wallet application 226 or app) to be used by the mobile device 104 in association with the URI obtained by the mobile device 104. For example, the wallet app server 110 may determine, based at least in part on the app label and version indicator, which application the mobile device 104 is requesting. At exchange 318, the gateway server 108 may transmit the message and/or notification to the mobile device 104. The exchange 318 message may be an appropriately tailored re-direct URI in response to the original exchange 306 received from the mobile device. In some embodiments, the re-direct URI may initiate the launch of the wallet application 226. The re-direct URI may be based at least in part on data associated with the originally scanned and/or obtained URI.

At exchange 320, the mobile device 104, responsive to receiving the message and/or notification from the gateway server 108 may establish communication with the designated app store server 112 to request the wallet application 226 or app. At exchange 322, the app store server 112 may determine, based at least in part on information received from the mobile device 104, whether the mobile device has the requested wallet application 226 or app. If the requested wallet application 226 or app is already installed on the mobile device 104, the app store server 112 may determine whether an update is needed. If an update is needed, the app store server 112 may initiate the download of the update onto the mobile device 104.

At exchange 324, if the requested wallet application 226 or app is not installed on the mobile device 104, the app store server 112 may initiate download of the wallet application 226 or app onto the mobile device 104. At exchange 326, after the wallet application 226 or app has been downloaded and launched, the mobile device may initiate the process for application registration, as described below in relation to FIG. 6. In some embodiments, at exchange 326, the wallet application 226 or wallet app may be launched in response to the re-direct URI received at exchange 318.

Figure 4:
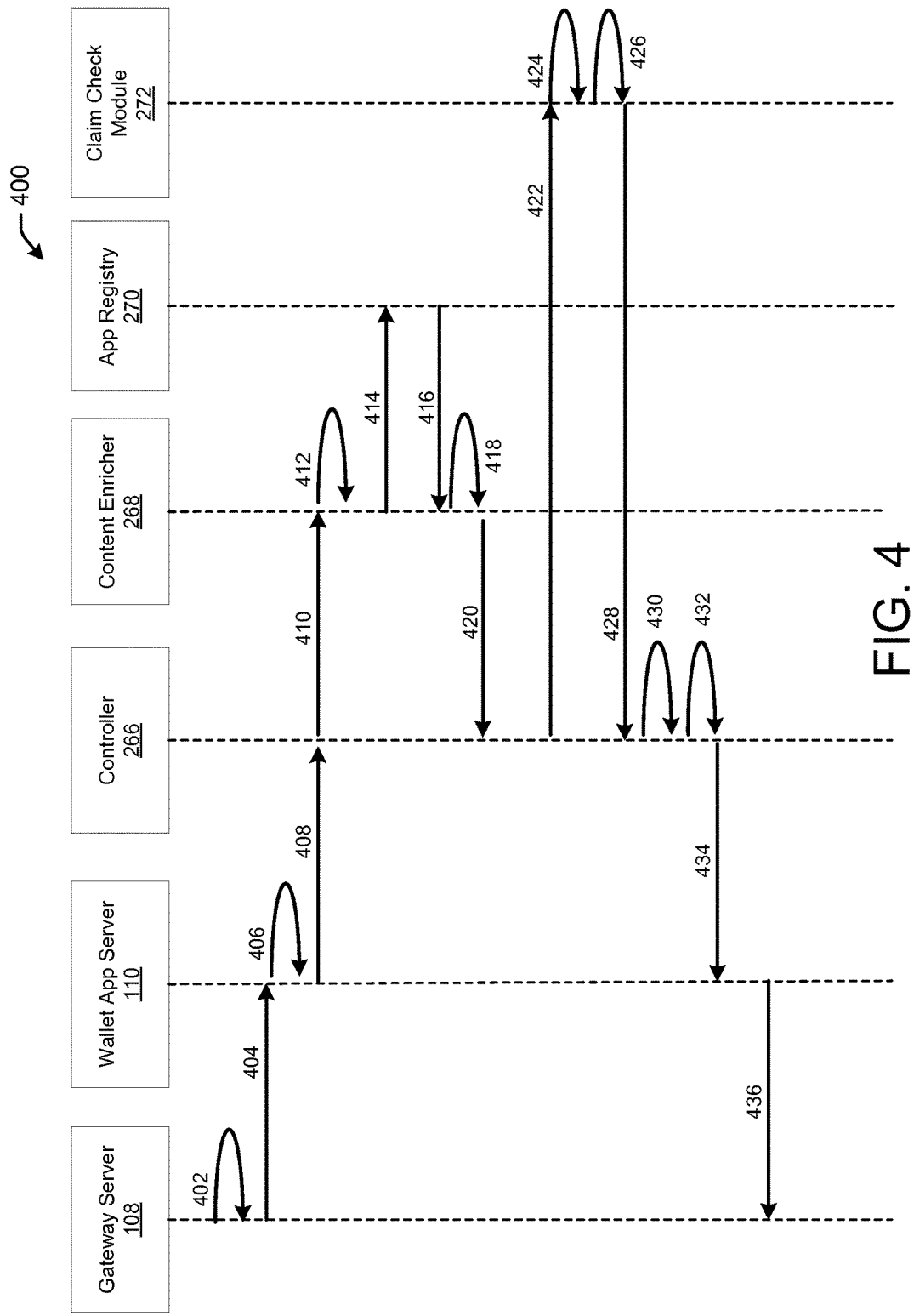
FIG. 4 is a process flow diagram of an illustrative method for claim check creation for mobile device purchase flows in accordance with one or more embodiments of the disclosure.

FIG. 4 is a process flow diagram of an illustrative method 400 for claim check creation for mobile device purchase flows in accordance with one or more embodiments of the disclosure. In some embodiments, the claim check creation mechanism is directed to how information obtained from the URI is used to lookup a wallet application 226 and send the mobile device 104 an app store server 110 redirect.

At exchange 402, the gateway server 108 may perform one or more security services on data received from the mobile device 104. At exchange 404, the wallet app server 110 may receive data from the gateway server and identify an app store server 112 to be associated with the mobile device 104 based at least in part on data received from the mobile device 104.

At exchange 404, the gateway server 108 may request an app store server link from the wallet app server 110. At exchange 406, the wallet app server 110 may receive data from the gateway server 108 and perform one or more security checks on the received data. For example, in some embodiments, the wallet app server 110 may authenticate the data based at least in part on the tag identifier and tag signature in the received data. At exchange 408, the wallet app server 110 may transmit a request to the controller 266 to request an app store server link. In some embodiments, the controller 266 may control the flow of application lookups, identify and/or parse data from request originating from a mobile device 104 (e.g., one or more parameters received via a URI), process the data from the request, generate a claim check, and/or facilitate and/or generate redirection instructions associated with redirecting the mobile device 104 to the appropriate app store server 112. The controller 266 may generate a request to transmit to the content enricher 268 for mobile application information.

At exchange 410, the content enricher 268 may receive the request from the controller 266 for mobile application enricher. At exchange 412, the content enricher 268 may evaluate the user agent information associated with the web browser 228 to identify any additional information that may be available (e.g., version, platform associated with the mobile device 104). At exchange 414, the content enricher 268 may request additional mobile application information from an app registry 270. The app registry may include information associated with an application (e.g., wallet application 226 or app and its location in one or more app store servers 112. At exchange 416, the app registry 270 may obtain information based on the request received from the content enricher 268 and generate a message that may include the obtained information. The app registry 270 may transmit the message to the content enricher 268.

At exchange 418, the content enricher 268 may enrich the request received from the app registry 270. In some embodiments, enriching the request may include augmenting or otherwise providing additional information, such as an IP address associated with the mobile device 104, geolocation information associated with the mobile device 104, browser user agent information associated with a web browser 228 associated with the mobile device, or the like.

At exchange 420, the content enricher 268 may transmit the enriched message that includes the mobile application information to the controller 266.

At exchange 422, the controller 266, responsive to receiving the enriched message from the content enricher 268, may transmit a message to the claim check module 272 to generate a claim check. At exchange 424, the claim check module 272 may generate a unique claim check key in response to receiving the message from the controller 266. At exchange 426, the claim check module 272 may extract and store information from the message received from the controller 266 and generate the claim check based at least in part on the extracted information.

At exchange 428, the claim check module 272 may generate a message that includes the unique claim check key and/or information associated with the generated claim check, and transmit the message to the controller 266.

At exchange 430, the controller 266 may receive the message from the claim check module 272 and cache the claim check key. At exchange 432, the controller 266 may generate a response to the request for an app store link from exchange 408 based at least in part on the information received from the claim check module 272. The response may include information associated with the generate claim check (e.g., claim check key) as well as redirection instructions to direct the gateway server 108 to the appropriate app store server 112 to obtain the wallet application 226.

The controller 266 may take the claim check and the claim check key received from the claim check module 272 and store the data in cache. In some embodiments, the data may be stored in cache with additional data that may be used to link the wallet application registration with the original request received from the mobile device 104 (e.g., obtaining the URI and launching the web browser 228 in response to scanning a QR code 106).

At exchange 434, the controller 266 may transmit the generated message responsive to the request at exchange 408 to the wallet app server 110. At exchange 436, the wallet app server 110 may transmit the response received from the controller 266 to the gateway server 108, which may transmit the response to the mobile device 104.

Figure 5:
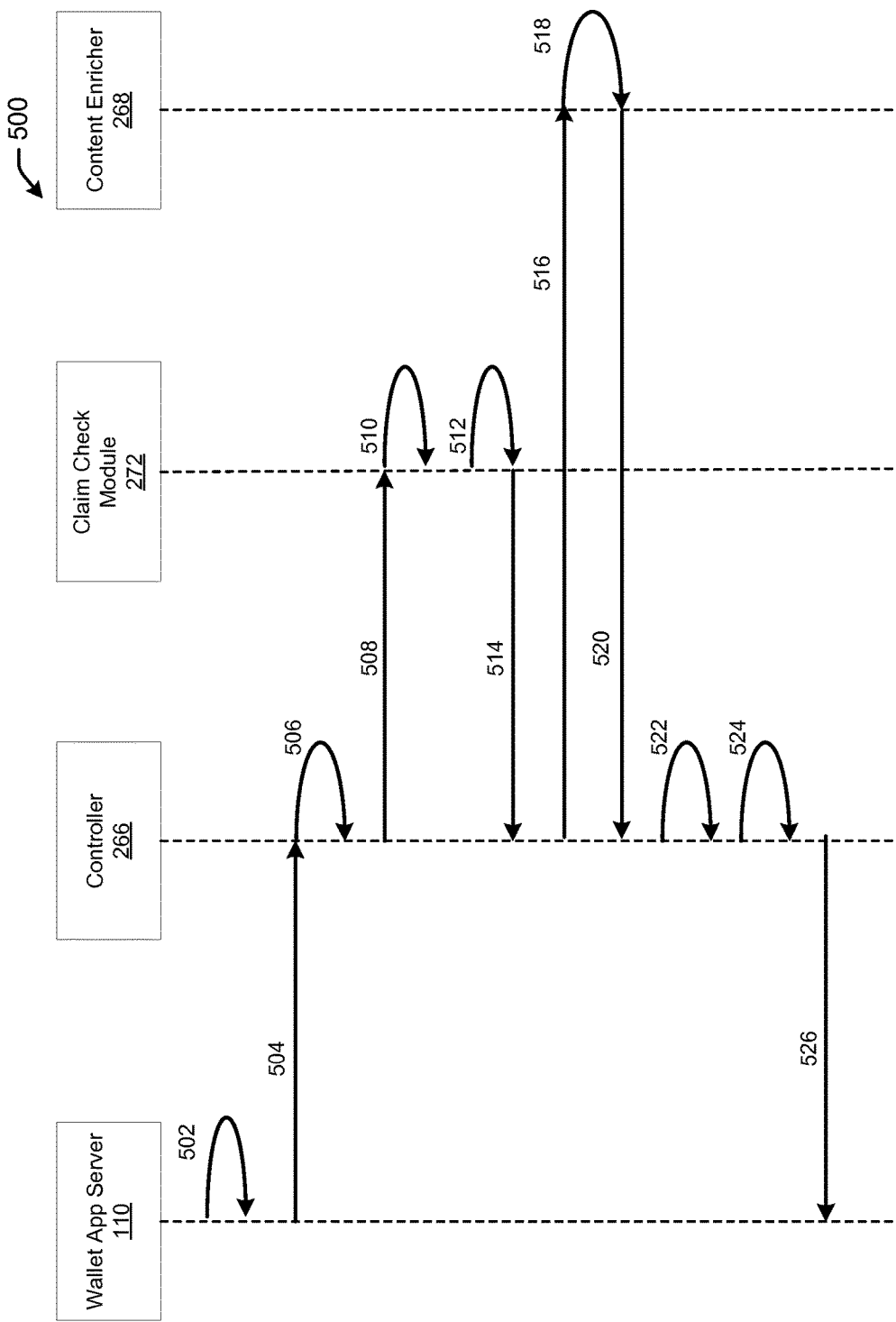
FIG. 5 is a process flow diagram of an illustrative method for claim check retrieval for mobile device purchase flows in accordance with one or more embodiments of the disclosure.

FIG. 5 is a process flow diagram of an illustrative method 500 for claim check retrieval for mobile device purchase flows in accordance with one or more embodiments of the disclosure. The method 500 for claim check retrieval is directed to retrieving stored data during a prior request in the method for app discovery (e.g., FIG. 3). In some embodiments, the method 500 for claim check retrieval may be to match a wallet registration process with the original request received from the mobile device 104 to download the wallet application 226 or app. If a match is made, the user 102 may automatically be directed to proceed with their original action (e.g., initiating a transaction to buy a product and/or service).

At exchange 502, the wallet app server 110 may perform one or more security services on data received from other services (e.g., business services server 650 and/or gateway server 108). At exchange 504, the wallet app server 108 may send a request to the controller 266 for a cached claim check. In some embodiments, the key in the cache may be based on mobile IP and/or geolocation information associated with the mobile device 104. If no match is made, the controller 266 may generate a response indicating a claim check does not exist and transmit the message back to the wallet app server 110. At exchange 506, the controller 266 may retrieve a cached key associated with the requested claim check. At exchange 508, the controller 266 may transmit the retrieved key to the claim check module 272. At exchange 510, the claim check module 272 may obtain information from one or more datastores based at least in part on the key received from the controller 266. At exchange 512, based at least in part on the data obtained from the one or more datastores, the claim check module 272 may update the claim check status. At exchange 514, the claim check module 272 may generate and/or update a message to include the data obtained from the datastores and transmit the message to the controller 266. At exchange 516, the controller 266 may receive the message and data from the claim check module 272, process the message and data and transmit the message and data to the content enricher 268 to enrich the message. At exchange 518, the content enricher 268 may enrich the message received from the controller 266. In some embodiments, enriching the message may include augmenting the message with data received from the mobile device, such as an IP address associated with the mobile device 104, geo-location information associated with the mobile device 104, browser agent information associated with a web browser 228 of the mobile device 104, and the like. The additional information may have been received from the mobile device 104, such as with a request received from the mobile device 104 via a URI.

At exchange 520, the content enricher 268 may transmit the enriched message to the controller 266. At exchange 522, the controller 266 may receive the enriched message from the content enricher 268 and remove the cached claim check key from the message. At exchange 524, the controller 266 may generate a response based on the enriched message received from the content enricher 268 and, at exchange 526, transmit the response to the wallet app server 110. In some embodiments, the response may include wallet registration information as well as the enriched message associated with the mobile device 104 which may be used to facilitate a financial transaction by the wallet application 226 executing on the mobile device 104.

Figure 6:
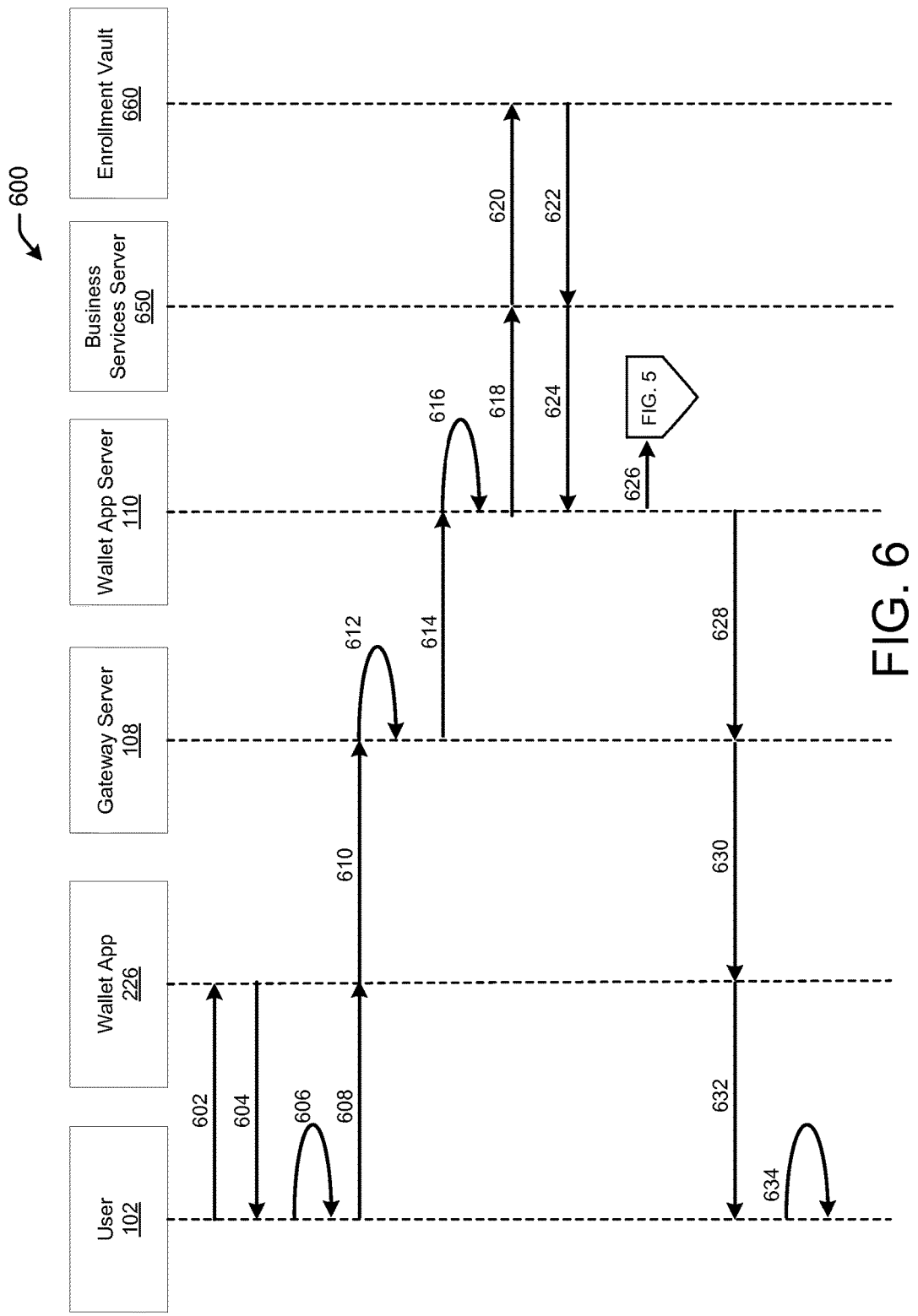
FIG. 6 is a process flow diagram of an illustrative method for application registration for mobile device purchase flows in accordance with one or more embodiments of the disclosure.

FIG. 6 is a process flow diagram of an illustrative method 600 for application registration for mobile device purchase flows in accordance with one or more embodiments of the disclosure. At exchange 602, the user 102 may open the wallet application 226 or app. At exchange 604, the wallet application 226 or app may perform a check on the mobile device 104 to determine whether the wallet application 226 or app is registered. In some embodiments, the check may be performed only upon a new installation of the wallet application 226 or app. If the wallet application 226 or app determines that the wallet application 226 or app is not registered, then at exchange 606, the user 102 is prompted to enter registration information. In some embodiments, the mobile device 104 may display messages to request information and may receive the requested information from the user 102. For example, the mobile device 104 may request the user 102 to enter personal information, contact information, and the like.

At exchange 608, the registration information may be received by the wallet application 226 or app and stored. At exchange 610, the wallet application 226 or app may transmit the information to a gateway server 108 to proceed with the registration process. At exchange 612, the gateway server 108 may perform one or more security services on the information received from the wallet application 226 or app. At exchange 614, the gateway server 108 may transmit the information received from the wallet application 226 or app to the wallet app server 110. At exchange 616, the wallet app server 110 may perform one or more security services on the information received from the gateway server 108. At exchange 618, the wallet app server 110 may transmit the registration information to a business services server 650 for processing to register the user 102 and the wallet application 226 or app. At exchange 620, the business services server 650 may transmit the registration information to an enrollment vault 660 for final processing and storage. At exchange 622, the enrollment vault 660 may transmit a response or notification back to the business services server 650 with a status update regarding the registration of the user 102 and wallet application 226 or app. In some embodiments, the business services server 650 may initiate process to add value-added services in association with the registration of the user 102 and/or wallet application 226 or app.

At exchange 624, the business services server 650 may transmit a notification to the wallet app server 110 with a statue update regarding the registration of the user 102 and the wallet application 226 or app. In some embodiments, the business services server 650 may initiate the process for claim check retrieval for mobile device purchase flows, as described above in relation to FIG. 5. In some embodiments, the claim check may allow the retrieval of data that may have come from a request to purchase an item or service via a URI (e.g., obtained from scanning a QR code 106) but in the case where the wallet application 226 or app had not yet been installed on mobile device 104.

At exchange 628, the wallet app server 110 may generate a notification indicating the user 102 and/or wallet application 226 or app has been successfully registered and transmit the notification to the gateway server 108. At exchange 630, the gateway server 108 may transmit the notification from the wallet app server 110 or generate a new message to the wallet application indicating the user 102 and/or wallet application 226 or app has been successfully registered and transmit the notification to the wallet application 226 or app. At exchange 632, the wallet application 226 or app may present the notification received from the gateway server 108 to the user 102. At exchange 634, the wallet application 226 or app may perform different application functionalities, such as initiating and/or facilitating completion of a financial transaction.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
    initiating a purchase transaction by obtaining a uniform resource identifier (URI), wherein the URI comprises information associated with a product or a service;
    launching a browser based at least in part on the URI;
    generating, by a server, a claim check key based at least in part on the URI, wherein the claim check key comprises unique identifying information associated with the purchase transaction;
    storing the claim check key on the server;
    receiving a re-direct URI in response to transmitting the claim check key;
    executing an application in response to receiving the re-direct URI from the server, wherein the application can facilitate completion of the purchase transaction for the product or the service;
    transmitting, by the application, mobile IP or geolocation data to the server; and
    facilitating, without having to re-obtain the URI, and by the application, completion of the purchase transaction for the product or the service based at least in part on matching the claim check key and the mobile IP or geolocation data at the server and retrieving information based at least in part on the claim check key and the mobile IP or geolocation data.

2. The non-transitory computer-readable medium of claim 1, the operations further comprising:
    obtaining, from one or more sensors associated with the mobile device, the URI from a quick response (QR) code or a near field communication tag.

3. The non-transitory computer-readable medium of claim 1, the operations further comprising:
    obtaining the URI from a hyperlink selected by a user of the mobile device.

4. The non-transitory computer-readable medium of claim 1, the operations further comprising:
    in response to the server determining the application is not stored on the mobile device, receiving instructions from the server redirecting the browser to an application store to obtain the application; and
    installing the application on the mobile device.

5. The non-transitory computer-readable medium of claim 4, the operations further comprising:
    determining that the application is not registered with the server;
    receiving registration information from a user of the mobile device;
    transmitting the registration information to the server; and
    receiving, from the server, confirmation that the application is registered with the server.

6. The non-transitory computer-readable medium of claim 1, wherein the URI comprises a plurality of parameters, the parameters comprising at least one of: an application label, a version indicator, a tag identifier, a tag signature, or a merchant name.

7. The non-transitory computer-readable medium of claim 1, wherein the data associated with the URI is saved on the server based on an action by the browser and retrieved based on an action by the application.

8. A computer-implemented method comprising:
    initiating a purchase transaction by obtaining a uniform resource identifier (URI), wherein the URI comprises information associated with a product or a service;
    launching a browser based at least in part on the URI;
    generating, by a server, a claim check key based at least in part on the URI, wherein the claim check key comprises unique identifying information associated with the purchase transaction;
    storing the claim check key on the server;
    receiving a re-direct URI in response to transmitting the claim check key;
    executing an application in response to receiving the re-direct URI from the server, wherein the application can facilitate completion of the purchase transaction for the product or the service;
    transmitting, by the application, mobile IP or geolocation data to the server; and
    facilitating, without having to re-obtain the URI, and by the application, completion of the purchase transaction for the product or the service based at least in part on matching the claim check key and the mobile IP or geolocation data at the server and retrieving information based at least in part on the claim check key and the mobile IP or geolocation data.

9. The computer-implemented method of claim 8, further comprising:
    obtaining, by the one or more processors from one or more sensors associated with the mobile device, the URI from a quick response (QR) code or a near field communication tag.

10. The computer-implemented method of claim 8, further comprising:
    obtaining, by the one or more processors, the URI from a hyperlink selected by a user of the mobile device.

11. The computer-implemented method of claim 8, further comprising: in response to the server determining the application is not stored on the mobile device,
    receiving instructions from the server redirecting the browser to an application store to obtain the application; and
    installing, by the one or more processors, the application on the mobile device.

12. The computer-implemented method of claim 11, further comprising:
    determining, by the one or more processors, that the application is not registered with the server;
    receiving, by the one or more processors, registration information from a user of the mobile device;
    transmitting, by the one or more processors, the registration information to the server; and
    receiving, by the one or more processors from the server, confirmation that the application is registered with the server.

13. The computer-implemented method of claim 8, wherein the URI comprises a plurality of parameters, the parameters comprising at least one of: an application label, a version indicator, a tag identifier, a tag signature, or a merchant name.

14. The computer-implemented method of claim 8, wherein the data associated with the URI is saved on the server based on an action by the browser and retrieved based on an action by the application.

15. A system comprising:
   at least one memory storing computer-executable instructions; and
   at least one processor, wherein the at least one processor is configured to access the at least one memory and to execute the computer-executable instructions to:
   initiate a purchase transaction by obtaining a uniform resource identifier (URI), wherein the URI comprises information associated with a product or a service;
   launch a browser based at least in part on the URI;
   generating, by a server, a claim check key based at least in part on the URI, wherein the claim check key comprises unique identifying information associated with the purchase transaction;
   store the claim check key on the server;
   receive a re-direct URI in response to transmitting the claim check key;
   execute an application in response to receiving the re-direct URI from the server, wherein the application can facilitate completion of the purchase transaction for the product or the service;
   transmit, by the application, mobile IP or geolocation data to the server; and
   facilitate, without having to re-obtain the URI, and by the application, completion of the purchase transaction for the product or the service based at least in part on matching the claim check key and the mobile IP or geolocation data at the server and retrieving information based at least in part on the claim check key and the mobile IP or geolocation data.

16. The system of claim 15, wherein the at least one processor is further configured to execute the computer-executable instructions to:
   obtain, from one or more sensors associated with the mobile device, the URI from a quick response (QR) code or a near field communication tag.

17. The system of claim 15, wherein the at least one processor is further configured to execute the computer-executable instructions to:
   obtain the URI from a hyperlink selected by a user of the mobile device.

18. The system of claim 15, wherein the at least one processor is further configured to execute the computer-executable instructions to:
   in response to the server determining the application is not stored on the mobile device, receive instructions from the server redirecting the browser to an application store to obtain the application; and
   install the application on the mobile device.

19. The system of claim 18, wherein the at least one processor is further configured to execute the computer-executable instructions to:
   determine that the application is not registered with the server;
   receive registration information from a user of the mobile device;
   transmit the registration information to the server; and
   receive, from the server, confirmation that the application is registered with the server.

20. The system of claim 15, wherein the URI comprises a plurality of parameters, the parameters comprising at least one of: an application label, a version indicator, a tag identifier, a tag signature, or a merchant name.

21. The system of claim 15, wherein the data associated with the URI is saved on the server based on an action by the browser and retrieved based on an action by the application.

* * * * *